(12) United States Patent
Kawai et al.

(10) Patent No.: US 9,709,196 B2
(45) Date of Patent: Jul. 18, 2017

(54) THREADED JOINT FOR HEAVY-WALLED OIL COUNTRY TUBULAR GOODS

(71) Applicant: JFE Steel Corporation, Tokyo (JP)

(72) Inventors: Takamasa Kawai, Chita (JP); Kazunari Takahashi, Chita (JP); Hiroshi Chikatsune, Chita (JP); Masaki Yoshikawa, Chita (JP); Jun Takano, Chita (JP); Takuya Nagahama, Chita (JP); Masateru Ueta, Houston, TX (US); Tsuyoshi Yoneyama, Chita (JP); Hideo Sato, Chita (JP); Haruhiko Seki, Chita (JP)

(73) Assignee: JFE Steel Corporation (JP)

( * ) Notice: Subject to any disclaimer, the term of this patent is extended or adjusted under 35 U.S.C. 154(b) by 0 days.

(21) Appl. No.: 15/108,856

(22) PCT Filed: Oct. 30, 2014

(86) PCT No.: PCT/JP2014/005518
§ 371 (c)(1),
(2) Date: Jun. 29, 2016

(87) PCT Pub. No.: WO2015/104739
PCT Pub. Date: Jul. 16, 2015

(65) Prior Publication Data
US 2016/0319966 A1    Nov. 3, 2016

(30) Foreign Application Priority Data

Jan. 10, 2014   (JP) ................................ 2014-002863

(51) Int. Cl.
*F16L 25/00* (2006.01)
*F16L 15/04* (2006.01)
(Continued)

(52) U.S. Cl.
CPC ............ *F16L 15/04* (2013.01); *E21B 17/042* (2013.01); *F16L 15/004* (2013.01); *F16L 15/06* (2013.01)

(58) Field of Classification Search
CPC ...................................................... F16L 15/04
(Continued)

(56) References Cited

U.S. PATENT DOCUMENTS 4,623,173 A * 11/1986 Handa ................... E21B 17/042
                                                   285/333
4,984,829 A *  1/1991 Saigo .................... F16L 15/004
                                                   285/334

(Continued)

FOREIGN PATENT DOCUMENTS

CA    2 827 922      9/2012
JP    5-87275 A      4/1993

(Continued)

OTHER PUBLICATIONS

Japanese Office Action dated Jun. 14, 2015, of corresponding Japanese Application No. 2014-002863, along with a Concise Statement of Relevance of Office Action in English.

(Continued)

*Primary Examiner* — Aaron Dunwoody
(74) *Attorney, Agent, or Firm* — DLA Piper LLP (US)

(57) ABSTRACT

A threaded joint for heavy-walled oil country tubular goods can both ensure sealability and prevent galling in a state where a high external pressure is also applied to the threaded joint in addition to a high compressive force. A surface of a pin side forming a seal portion and a surface of a box side forming a seal portion are formed into a convex curved surface and a tapered surface, respectively. A seal thickness $t_s$ of the pin is 15 mm or less, a shape parameter $t_s/D$ (D: outer diameter of a pin raw pipe portion) is 0.045 or more, (Continued)

and a complete thread length ratio L/t (L: complete thread length of the pin, t: wall thickness of the pin raw pipe portion) is 4.0 or less.

4 Claims, 3 Drawing Sheets

(51) Int. Cl.
    *F16L 15/00*     (2006.01)
    *F16L 15/06*     (2006.01)
    *E21B 17/042*     (2006.01)

(58) Field of Classification Search
    USPC .............................. 285/333, 334, 355, 390
    See application file for complete search history.

(56) References Cited

U.S. PATENT DOCUMENTS

| | | | |
|---|---|---|---|
| 5,137,310 A | | 8/1992 | Noel et al. |
| 6,237,967 B1* | | 5/2001 | Yamamoto ............ E21B 17/042 285/333 |
| 8,840,151 B2* | | 9/2014 | Hignett ................. E21B 17/042 285/333 |
| 2004/0017079 A1 | | 1/2004 | Carcagno et al. |
| 2005/0248153 A1* | | 11/2005 | Sugino .................. E21B 17/042 285/333 |
| 2011/0241339 A1* | | 10/2011 | Verger .................. E21B 17/042 285/332.2 |
| 2014/0049045 A1* | | 2/2014 | Yoshikawa ........... F16L 15/001 285/333 |
| 2014/0116560 A1 | | 5/2014 | Kawai et al. |
| 2015/0061287 A1* | | 3/2015 | Yoshikawa ........... E21B 17/042 285/334 |
| 2016/0178095 A1* | | 6/2016 | Kawai .................... E21B 17/08 285/390 |

FOREIGN PATENT DOCUMENTS

| | | |
|---|---|---|
| JP | 9-119565 A | 5/1997 |
| JP | 10-96489 A | 4/1998 |
| JP | 4257707 B2 | 4/2009 |
| WO | 2012/056500 A1 | 5/2012 |
| WO | 2012/118167 A1 | 9/2012 |

OTHER PUBLICATIONS

Supplementary European Search Report dated Feb. 2, 2017, of corresponding European Application No. 14877606.5.

* cited by examiner

THREADED JOINT FOR HEAVY-WALLED OIL COUNTRY TUBULAR GOODS

TECHNICAL FIELD

This disclosure relates to a threaded joint for heavy-walled oil country tubular goods, and more particularly to a threaded joint for heavy-walled oil country tubular goods having excellent durability and suitable for connection of steel pipes such as OCTG (oil country tubular goods) which include tubings or casings generally used for search and production of oil wells or gas wells, riser pipes or line pipes. "Durability" means performance that allows the threaded joint to maintain sufficient sealability against external pressure in a state where a high external force, for example, an external force corresponding to 80% of API collapse pressure stipulated in API 5C3 is also applied to the threaded joint in addition to a compressive force of 80% or more of a yield load (yield stress×cross-sectional area of non-formed portion) in a pipe axis direction, for example, without generating galling.

BACKGROUND

Threaded joints for pipes are popularly used to connect steel pipes used in petroleum installations of oil industry such as oil country tubular goods. In connecting steel pipes used for search and production of oil or gas, conventionally, a standard threaded joint stipulated in API (American Petroleum Institute) standard has been typically used.

However, recently, since the deep wells for crude oil or natural gas have been in progress and horizontal wells and directional wells on behalf of vertical wells have been increasing, excavation and production environments are becoming severe. Further, wells developed in severe circumstances such as oceans and polar regions have been increasing. Hence, the performances that threaded joints have to satisfy are diversified including compression resistance, bending resistance, sealability against external pressure (external pressure resistance). In view of the above, the use of a special threaded joint having high performances which is referred to as a "premium joint" is increasing, and a demand for the improvement in performance of the premium joint is also steadily increasing.

The premium joint is ordinarily a coupling-type joint. The coupling-type joint joins an externally-threaded member (hereinafter referred to as "pin") formed on a pipe end portion and an internally-threaded member (hereinafter referred to as "box") to connect the pins to each other. The pin includes a tapered thread, a metal-to-metal seal portion (hereinafter referred to as a "seal portion") and a torque shoulder (hereafter referred to as a "shoulder"). The box also includes a tapered thread, a seal portion and a shoulder. The tapered thread is important to firmly fix the pipe joint. Bringing the box and the pin into a metal contact at seal portions thereof has the seal portions function to ensure sealability. The shoulder forms a shoulder surface that functions as an abutment during making up the joint.

FIG. 3(a) to FIG. 3(c) are schematic explanatory views of a premium joint for oil country tubular goods, which are vertical cross-sectional views of a threaded joint for cylindrical pipes. The threaded joint includes a pin 3 and a box 1 into which the pin 3 is fitted. The pin 3 has, on the outer surface thereof, an externally-threaded member 7 and a nose (also referred to as a pin nose) 8 which is a portion formed adjacent to the externally-threaded member 7 on an end of the pin 3 and has no threads. The nose 8 has a seal portion 13 on the outer peripheral surface thereof, and a shoulder 14 on the end surface thereof. The box 1 into which the pin 3 is fitted is a portion having an internally-threaded member 5, a seal portion 11 and a shoulder 12 on the inner surface thereof, and these portions 5, 11, and 12 are portions being threadedly engaged with or brought into contact with the externally-threaded member 7, the seal portion 13 and the shoulder 14 of the pin 3, respectively. In FIG. 3(a), a chain line indicates a pipe axis.

In the conventional example shown in FIG. 3(c), the threaded joint is of a so-called "pin end seal" type where the seal portions 11 and 13 are positioned at the end portion of the nose 8, thereby imparting an appropriate make up torque to realize desired seal performance. However, in the conventional example shown in FIG. 3(c), the make up torque is influenced by lubrication condition, surface quality and the like. In view of the above, as a design of a threaded joint that does not largely depend on these factors, there has been known a radial-directional seal type (also referred to as a radial seal type) threaded joint where a radial-directional component of seal contact pressure is relatively increased. The seal portions 11 and 13 of the radial seal type threaded joint are generally positioned at an intermediate portion of the nose 8 in the pipe axis direction.

Along with the progress of deep wells described above, the use of heavy-walled oil country tubular goods having high corrosion resistance and high strength has increased to cope with a high-temperature and high-pressure environment.

Under such circumstances, there is a related art to cope with a demand for a threaded joint having high galling resistance and high sealability even under a large compressive load while maintaining gas tight performance of the threaded joint per se. For example, a means where a ratio of a cross-sectional area of contact surface of shoulder on a box side (an area of region obtained by projecting the contact surface on a plane orthogonal to a pipe axis) to a cross-sectional area of a pin raw pipe (a cross-sectional area of a pin non-formed portion of steel pipe where pin forming is applied to an end portion of the steel pipe) is set to a predetermined value (0.5) or more (Japanese Patent No. 4257707 (JP-T-2005-526936)) is known.

Particularly, a threaded joint including a pin where a wall thickness of a raw steel pipe for forming the pin (wall thickness of a non-formed portion of the steel pipe where pin forming is applied to an end portion of the steel pipe) is 18 mm or more and a box that connects the pin to each other, needs ensuring sealability under a composite load of extremely high axial compressive force and extremely high external pressure. Hence, a seal portion is required to possess a high contact pressure. On the other hand, when the contact pressure is excessively high, there is a possibility that galling occurs due to sliding at the time of making and breaking the threaded joint. Accordingly, it is necessary to design a contact pressure such that both ensuring sealability and prevention of galling are well-balanced.

However, the above-mentioned related art expects only the ensuring of performances under a high compressive force, and does not take into consideration acquisition of both ensuring sealability and prevention of galling in a state where a high external pressure is also applied in addition to a high compressive force. According to the above-mentioned related art, it is impossible to acquire both ensuring sealability and prevention of galling in a state where a high external pressure is also applied in addition to a high compressive force by only setting of a ratio of a cross-sectional area of contact surface of shoulder on a box side to a cross-sectional area of a pin raw pipe to a predetermined value (0.5) or more.

It could therefore be helpful to provide a threaded joint for heavy-walled oil country tubular goods that both ensures sealability and prevents galling in a state where a high external pressure is also applied to the threaded joint in addition to a high compressive force.

SUMMARY

We thus provide:

[1] A threaded joint for heavy-walled oil country tubular goods, the threaded joint including: a pin which includes an externally-threaded member formed by applying taper thread forming to an end portion of a steel pipe having a wall thickness of 18 mm or more, a nose extending toward an end side of the steel pipe from the externally-threaded member and being a non-threaded portion, and a shoulder formed at an end of the nose; and a box which includes an internally-threaded member which is threadedly joined with the externally-threaded member, an inner periphery of a seal portion of the box facing a nose outer peripheral surface of the pin in an opposed manner, and a shoulder which is brought into contact with the shoulder of the pin; wherein, the pin and the box are joined to each other by threaded joining so that the nose outer peripheral surface and the inner periphery of the seal portion of the box are brought into a metal contact with each other in a pipe radial direction, thereby forming a seal portion which seals a fluid at the contact portions, a pin-side surface and a box-side surface which form the seal portions are formed into a convex curved surface and a tapered surface respectively, a seal thickness $t_s$ of the pin which is a thickness of the nose in cross section in the pipe radial direction including a seal point is set to 15 mm or less, the seal point being a nose outer peripheral point at a portion where a length of an overlapping margin in a pipe radial direction becomes maximum when drawings of the same scale on which the pin and the box are described respectively are made to overlap with each other such that the shoulders agree with each other, a shape parameter $t_s/D$ which is obtained by dividing the seal thickness $t_s$ of the pin by an outer diameter D of a pin raw pipe portion is set to 0.045 or more, and a ratio of a complete thread length L of the pin which is a length of a complete threaded portion of the externally-threaded member in a pipe axis direction to a wall thickness t of the pin raw pipe portion, the ratio which is a complete thread length ratio L/t is set to 4.0 or less.

[2] The threaded joint for heavy-walled oil country tubular goods according to [1], wherein the shape parameter $t_s/D$ is set to 0.060 or more.

[3] The threaded joint for heavy-walled oil country tubular goods according to [1] or [2], wherein the seal thickness $t_s$ of the pin is set to 12 mm or less.

It is possible to realize a threaded joint for heavy-walled oil country tubular goods that can both ensure sealability and prevent galling in a state where a high external pressure is also applied to the threaded joint in addition to a high compressive force.

REFERENCE SIGNS LIST

Figure 1:
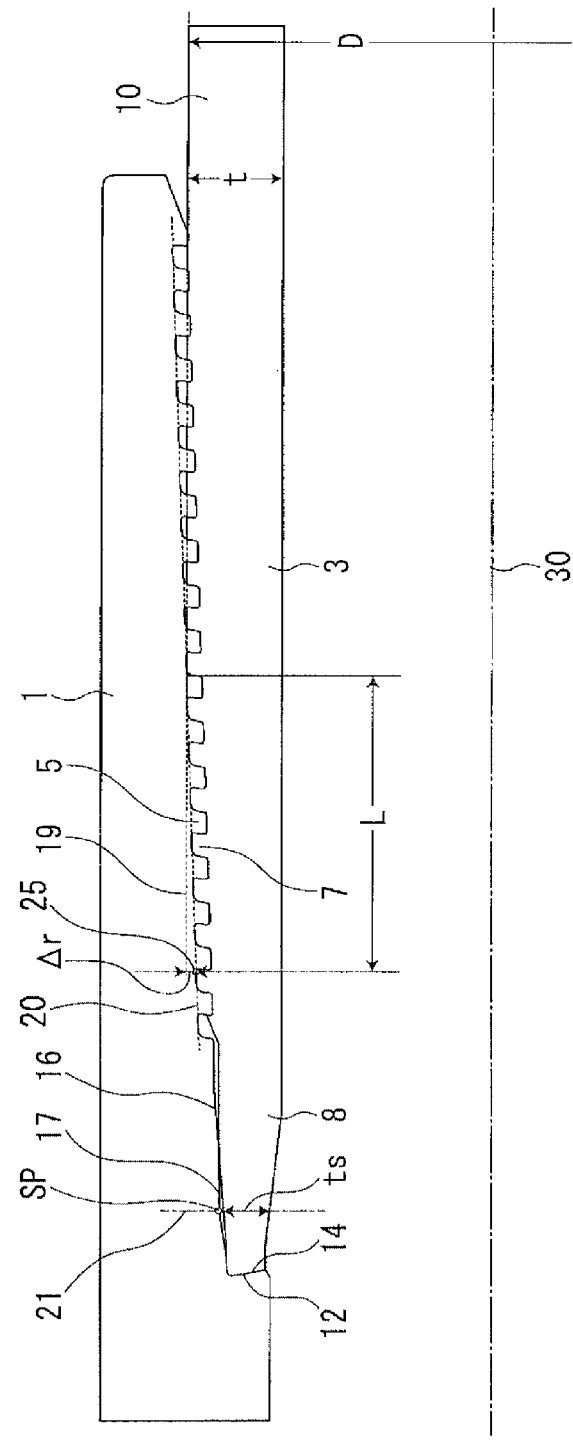
FIG. 1 is a schematic view of a cross section of our threaded joint in a pipe axis direction showing data for designing the threaded joint.

1: box
3: pin
5: internally-threaded member
7: externally-threaded member
8: nose
10: pin raw pipe portion
11: seal portion of box
12: shoulder of box
13: seal portion of pin
14: shoulder of pin
15: portion where tensile stress and strain become largest
16: inner peripheries of seal portion of box
17: nose outer peripheral surfaces
19: position on outer peripheral surface of pin raw pipe
20: thread taper base line of externally-threaded member
21: cross section in the pipe radial direction including seal point
25: final complete thread crest portion
30: pipe axis
D: outer diameter of pin raw pipe portion
L: complete thread length of pin
SP: seal point
t: wall thickness of pin raw pipe portion
$t_s$: pin seal thickness

DETAILED DESCRIPTION

An example of our threaded joint is explained by reference to FIGS. 1 and 2.

Our threaded joint includes a pin 3 and a box 1. The pin 3 includes an externally-threaded member 7 formed by applying taper thread forming to an end portion of a steel pipe having a wall thickness of 18 mm or more, a nose 8 extending toward an end side of the steel pipe from the externally-threaded member 7 and being a non-threaded portion, and a shoulder 14 formed at an end of the nose 8. The box 1 includes an internally-threaded member 5 (as a matter of course, tapered threads) threadedly joined with the externally-threaded member 7, an inner periphery of a seal portion of the box 16 facing a nose outer peripheral surface 17 of the pin 3 in an opposed manner, and a shoulder 12 in contact with the shoulder 14 of the pin 3. Our threaded joint for heavy-walled oil country tubular goods (see FIG. 1) joins the pin 3 and the box 1 by thread joining as the above so that the nose outer peripheral surface 17 and the inner periphery of the seal portion of the box 16 are brought into a metal contact with each other in a pipe radial direction, thereby forming a seal portion (seal portion 11 of the box 1, seal portion 13 of the pins 3) that seals a fluid.

From a viewpoint of ensuring sufficient sealability, increasing galling resistance and facilitating cutting work under the above-mentioned premise, we form the nose outer peripheral surface 17 of the seal portion 13 into a convex curved surface with respect to the pin 3, and form the seal hole inner peripheral surface 16 of the seal portion 11 into a tapered surface with respect to the box 1. The above-mentioned convex curved surface is a curved surface where the curve thereof forms a curved line in cross section in the pipe axis direction, a line segment connecting both the ends of a curved line region in the pipe axis direction is positioned in the inside of a pin body, and all points within the curved line region approach a pipe axis as these points approach a pipe end. Connecting a plurality of line segments to each other to have a common tangent line can form the above-mentioned curved line. Or connecting respective curved lines to each other by a straight line disposed therebetween also can form the curved line. The above-mentioned tapered surface is a conical surface where the tapered surface forms a straight line in cross section in the pipe axis direction, and all points within the straight line approach the pipe axis as these points approach the shoulder 12.

We set a seal thickness $t_s$ of the pin which is a thickness of the nose 8 in cross section 21 in the pipe radial direction including a seal point SP (see FIG. 2) to 15 mm or less. It is preferable that the seal thickness $t_s$ of the pin is 1 mm or more. It is more preferable that the seal thickness $t_s$ of the pin is 3 mm or more. It is still more preferable that the seal thickness $t_s$ of the pin is 5 mm or more. As shown in FIG. 2, the seal point SP is an outer peripheral point of the nose 8 at a portion where a length of an overlapping margin in the pipe radial direction becomes maximum when drawings of the same scale on which the pin 3 and the box 1 are described respectively are made to overlap with each other such that the shoulders 14 and 12 agree with each other.

We set a shape parameter $t_s/D$ obtained by dividing the seal thickness $t_s$ of the pin by an outer diameter D of a pin raw pipe portion 10 (see FIG. 1) to 0.045 or more. It is preferable that the upper limit of the shape parameter $t_s/D$ is 0.30.

We set a complete thread length ratio L/t which is a ratio of a complete thread length L of the externally-threaded member 7 to a wall thickness t (see FIG. 1) of the pin raw pipe portion 10 to 4.0 or less.

We adopted a method where a stress-strain state is evaluated by numerical calculation based on FEA (Finite Element Analysis) under various load conditions with respect to threaded joints having various sizes and shapes.

The following findings are obtained.

(a) A contact pressure at the seal point SP can be expressed using a shape parameter $t_s/D$. According to the result obtained by expressing the contact pressure at the seal point SP using the shape parameter $t_s/D$, a contact pressure necessary to ensure sealability under a high external pressure cannot be acquired unless the shape parameter $t_s/D$ is 0.045 or more. To ensure sealability even when an external pressure corresponding to 100% of API collapse pressure is applied as an external pressure, it is preferable that the shape parameter $t_s/D$ is 0.060 or more. It is also preferable that the upper limit of the shape parameter $t_s/D$ is 0.30.

(b) Sliding energy can be expressed using a parameter obtained by multiplying a shape parameter $t_s/D$ by an outer diameter D of the pin raw pipe portion 10 having a close relationship with a sliding distance, that is, using a seal thickness $t_s$ of the pin. According to the result obtained by expressing the sliding energy using the seal thickness $t_s$ of the pin, it is necessary to set the seal thickness $t_s$ of the pin to 15 mm or less to restrict the sliding energy within a range where galling resistance can be ensured.

To acquire an advantageous effect that galling can be prevented even when hard plating having Vickers hardness of 310 or more is not applied by further improving galling resistance, it is preferable that the seal thickness $t_s$ of the pin be 12 mm or less. It is also preferable that the seal thickness $t_s$ of the pin is 1 mm or more. It is more preferable that the seal thickness $t_s$ of the pin is 3 mm or more. It is still more preferable that the seal thickness $t_s$ of the pin is 5 mm or more.

(c) When a complete thread length L of the pin (see FIG. 1) is more long than necessary, not only a forming cost and a raw material cost are increased, but also there exists a possibility that galling occurs along with local abnormal contingence caused by irregularities in a thread lead (an advance distance of thread per one rotation) or a thread taper (an amount of decrease in thread diameter per unit distance of the thread lead). To prevent galling, it is preferable that the complete thread length L of the pin be set to less than or equal to 4.0 times as large as a wall thickness t of a pin raw pipe portion (see FIG. 1) (complete thread length ratio L/t≤4.0).

On the other hand, to prevent the occurrence of when the threaded portion exhibits excessively large plastic deformation prior to the pipe body (pin raw pipe portion 10) and jumps out at the time when a tensile load is applied, it is preferable to set a complete thread length L of the pin to a value of shear factor √3 or more, that is, more than or equal to a value which is calculated by multiplying a wall thickness t of the pin raw pipe portion 10 by 1.8 (pin complete thread length ratio L/t≥1.8) with respect to the threaded joint of which the tensile strength is 100% of the tensile strength of the pipe body. When the tensile strength of the threaded joint is M % (M<100) of the tensile strength of the pipe body, the pin complete thread length ratio L/t satisfies L/t≥1.8×M.

It is possible to obtain the outer diameter of the pin at the position of the seal point SP by deciding the seal thickness $t_s$ of the pin. In designing various threaded joints, the relative position between the seal point SP and the final complete thread crest on a pin pipe end side of the externally-threaded member 7 is decided separately. Accordingly, it is possible to obtain a thread cutting amount of the pin complete threaded portion (a region having the complete thread length L of pin) in a pipe radial direction based on the difference between an outer diameter of the pin at a final complete thread crest portion 25 decided separately as described above (see FIG. 1) and the outer diameter D of the pin raw pipe portion 10 (a value which is twice as large as a distance Δr in a pipe radial direction from a position 19 on an outer peripheral surface of the pin raw pipe at the final complete thread crest portion 25 shown in FIG. 1 to a thread taper base line 20 of the externally-threaded member 7). Among the thread cutting amount obtained in this manner, by selecting thread taper (thread taper satisfying 2×tan θ assuming an acute intersecting angle made by the thread taper base line 20 of the externally-threaded member 7 shown in FIG. 1 and a pipe axis 30 as θ) such that the complete thread length L of pin falls within our range, it is possible to realize a threaded joint for heavy-walled oil country tubular goods that can both ensure sealability and prevent galling in a state where a high external pressure is also applied to the threaded joint in addition to a high compressive force.

EXAMPLE

Figure 2:
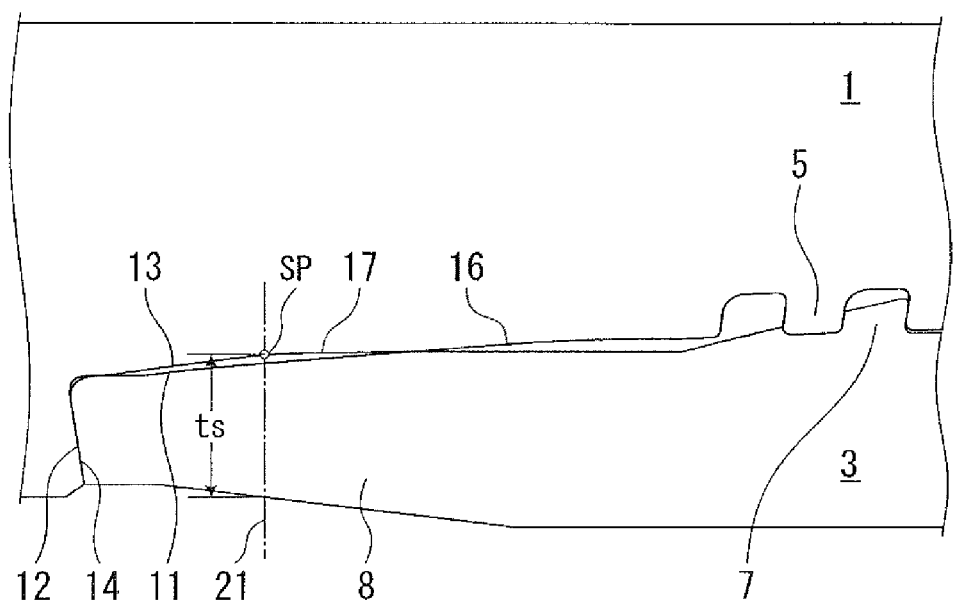
FIG. 2 is a schematic view of a cross section of our threaded joint in a pipe axis direction showing the definition of seal point SP and the definition of seal thickness $t_s$ of the pin.
Figure 3A:
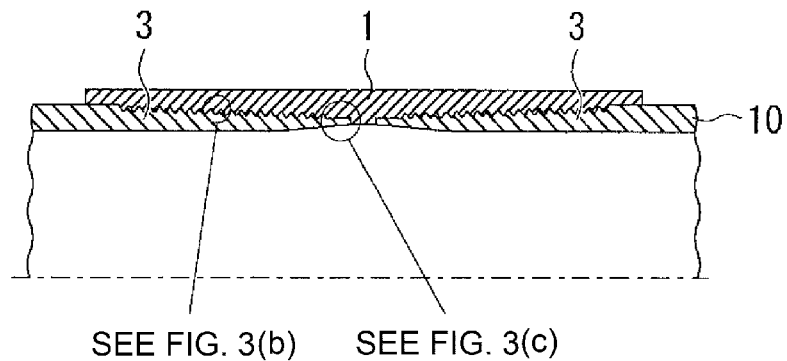
FIGS. 3(a) to 3(c) are schematic views of a cross section of one example of a conventional threaded joint for tubular goods in a pipe axis direction.
Figure 3B:
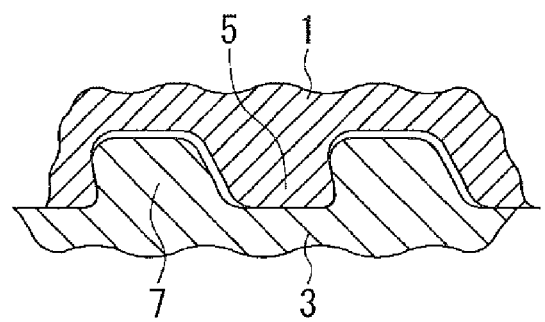
Figure 3C:
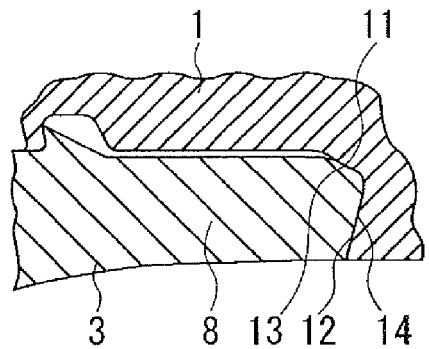

As a threaded joint for steel pipe made of Q125 carbon steel (yield strength: 130 ksi=896 MPa) that conforms to the API Standard, threaded joints each of which is constituted of a pin having data on respective levels shown in Table 1 and a box corresponding to the pin (joined by fitting) were designed and manufactured in a mode shown in FIG. 1. A pin-side surface that forms a seal portion is formed into a convex curved surface, and a box-side surface is formed into a tapered surface. The thread length was set to a desired value by changing the thread taper.

With respect to these samples of threaded joints, a hard plating (Cu—Sn alloy plating having Vickers hardness of Hv310 or more) and a manganese phosphate film having smaller galling resistance than the hard plating were respectively applied to an outer peripheral surface of an externally-threaded member and a nose of the pin under the same treatment condition at all levels, respectively. Thereafter, a galling resistance test was performed in accordance with the following test T1 to check the presence or non-presence of galling (disqualified when the galling is present, and qualified when the galling is not present). With respect to the samples where the galling is not present, a seal test was further performed in accordance with the following test T2 to check the presence or non-presence of leakage (disqualified when the leakage is present, and qualified when the leakage is not present).

Test T1

Make and Break where Make-up is performed with a high torque (more than or equal to a torque 0.95 times as large as a maximum torque) and, thereafter, Break-out is performed was repeated two times.

Test T2

80% external pressure (external pressure corresponding to 80% of API collapse pressure) or 100% external pressure (external pressure corresponding to 100% of API collapse pressure) was applied to the samples to which make-up was performed with a low torque (less than or equal to a torque 1.05 times as large as a minimum torque) as a Load Envelope defined in ISO13679.

Results of the above-mentioned tests are shown in Table 1. In Table 1, "qualified also with respect to manganese phosphate film" means that the samples were qualified not only with respect to hard plating but also with respect to manganese phosphate film. "Qualified with respect to hard plating" means that the samples were qualified with respect to hard plating although the samples were disqualified with respect to manganese phosphate film (galling present in a seal portion). "Qualified also at 100% external pressure" means that the samples were qualified not only at 80% external pressure but also at 100% external pressure. "Qualified at 80% external pressure" means that the samples were qualified at 80% external pressure although the samples were disqualified at 100% external pressure (leakage present).

It is understood from Table 1 that by setting the seal thickness $t_s$ of the pin to 15 mm or less, the shape parameter $t_s/D$ to 0.045 or more, and the complete thread length ratio L/t to 4.0 or less, all our examples (levels: 1 to 7) are qualified in the galling resistance test with respect to hard plating, and are also qualified in the seal test at 80% external pressure.

Among our examples (levels: 1 to 7), the examples (levels: 1, 2, 4, 5) where the seal thickness $t_s$ of the pin is 12 mm or less are qualified in the galling resistance test also with respect to manganese phosphate film. Further, among our examples (levels: 1 to 7), the examples (levels: 2, 3, 4) where the shape parameter $t_s/D$ is 0.060 or more are qualified in the seal test also at 100% external pressure.

On the other hand, the comparison example (level: 8) where the seal thickness $t_s$ of the pin exceeds 15 mm is disqualified in the galling resistance test (galling present in a seal portion). The comparison example (level: 9) where the complete thread length ratio L/t exceeds 4.0 is disqualified in the galling resistance test (galling present in a threaded portion). Further, the comparison example (level: 10) where the shape parameter $t_s/D$ is set less than 0.045 is disqualified in the seal test at 80% external pressure (leakage present).

As has been described above, it is possible to realize a threaded joint for heavy-walled oil country tubular goods that can both ensure sealability and prevent galling in a state where a high external pressure is applied to the threaded joint in addition to a high compressive force.

TABLE 1

| | Data for Designing Pin | | | | | | | | | |
|---|---|---|---|---|---|---|---|---|---|---|
| | Pin Raw Pipe Portion | | | Complete Thread Length Ratio | Seal Thickness $t_s$ of Pin | Shape Parameter $t_s/D$ | Make-up Torque | | Test Result | | |
| Level | Outer Diameter D (mm) | Wall Thickness t (mm) | Thread Taper (—) | L/t (—) | (mm) | (—) | Min. (kN · m) | Max. (kN · m) | Galling Resistance | Sealability | Remarks |
| 1 | 127.0 | 19.05 | 1/8 | 3.2 | 5.98 | 0.047 | 16000 | 20000 | qualified also with respect to manganese phosphate film | qualified at 80% external pressure | Our example |
| 2 | 127.0 | 19.05 | 1/8 | 2.2 | 9.35 | 0.074 | 16000 | 20000 | qualified also with respect to manganese phosphate film | qualified also at 100% external pressure | Our example |
| 3 | 177.8 | 30.48 | 1/8 | 2.5 | 14.77 | 0.083 | 40000 | 50000 | qualified with respect to hard plating | qualified also at 100% external pressure | Our example |
| 4 | 177.8 | 30.48 | 1/6 | 2.5 | 11.05 | 0.062 | 40000 | 50000 | qualified also with respect to manganese phosphate film | qualified also at 100% external pressure | Our example |
| 5 | 177.8 | 30.48 | 1/5 | 2.5 | 8.46 | 0.048 | 36000 | 45000 | qualified also with respect to manganese phosphate film | qualified at 80% external pressure | Our example |
| 6 | 273.1 | 25.40 | 1/16 | 3.3 | 14.60 | 0.053 | 80000 | 100000 | qualified with respect to hard plating | qualified at 80% external pressure | Our example |
| 7 | 273.1 | 25.40 | 1/10 | 2.0 | 14.39 | 0.053 | 72000 | 90000 | qualified with respect to hard plating | qualified at 80% external pressure | Our example |
| 8 | 177.8 | 30.48 | 1/8 | 2.5 | 15.23 | 0.086 | 40000 | 50000 | galling present in seal portion | | Comparison example |

TABLE 1-continued

| | Pin Raw Pipe Portion | | | Complete Thread | Seal | Shape | | | | | |
|---|---|---|---|---|---|---|---|---|---|---|---|
| | Outer Diam- | Wall Thick- | Thread | Length Ratio | Thick- ness $t_s$ | Param- eter | Make-up Torque | | Test Result | | |
| Level | eter D (mm) | ness t (mm) | Taper (—) | L/t (—) | of Pin (mm) | $t_s/D$ (—) | Min. (kN · m) | Max. (kN · m) | Galling Resistance | Sealability | Remarks |
| 9 | 177.8 | 30.48 | ⅛ | 4.2 | 8.45 | 0.048 | 40000 | 50000 | galling present in threaded portion | | Comparison example |
| 10 | 177.8 | 30.48 | ¼ | 2.3 | 5.32 | 0.030 | 32000 | 40000 | qualified also with respect to manganese phosphate film | leakage occurred at 80% external pressure | Comparison example |

The invention claimed is:

1. A threaded joint for heavy-walled oil country tubular goods comprising:
a pin including an externally-threaded member formed by applying taper thread forming to an end portion of a steel pipe having a wall thickness of 18 mm or more, a nose extending toward an end side of the steel pipe from the externally-threaded member and being a non-threaded portion, and a shoulder formed at an end of the nose; and
a box including an internally-threaded member threadedly joined with the externally-threaded member, an inner periphery of a seal portion of the box facing a nose outer peripheral surface of the pin in an opposed manner, and a shoulder brought into contact with the shoulder of the pin; wherein,
the pin and the box are joined to each other by threaded joining so that the nose outer peripheral surface and the inner periphery of the seal portion of the box are brought into a metal contact with each other in a pipe radial direction, thereby forming a seal portion that seals a fluid at the contact portions,
a pin-side surface and a box-side surface that form the seal portions are formed into a convex curved surface and a tapered surface, respectively,
a seal thickness $t_s$ of the pin which is a thickness of the nose in cross section in the pipe radial direction including a seal point is 15 mm or less, the seal point being a nose outer peripheral point at a portion where a length of an overlapping margin in a pipe radial direction becomes maximum when drawings of the same scale on which the pin and the box are described, respectively, overlap with each other such that the shoulders agree with each other,
a shape parameter $t_s/D$ obtained by dividing the seal thickness $t_s$ of the pin by an outer diameter D of a pin raw pipe portion is 0.045 or more, and
a ratio of a complete thread length L of the pin which is a length of a complete threaded portion of the externally-threaded member in a pipe axis direction to a wall thickness t of the pin raw pipe portion, the ratio which is a complete thread length ratio L/t is 4.0 or less.

2. The threaded joint for heavy-walled oil country tubular goods according to claim 1, wherein the shape parameter $t_s/D$ is 0.060 or more.

3. The threaded joint for heavy-walled oil country tubular goods according to claim 1, wherein the seal thickness $t_s$ of the pin is 12 mm or less.

4. The threaded joint for heavy-walled oil country tubular goods according to claim 2, wherein the seal thickness $t_s$ of the pin is 12 mm or less.

* * * * *